Figure 1:
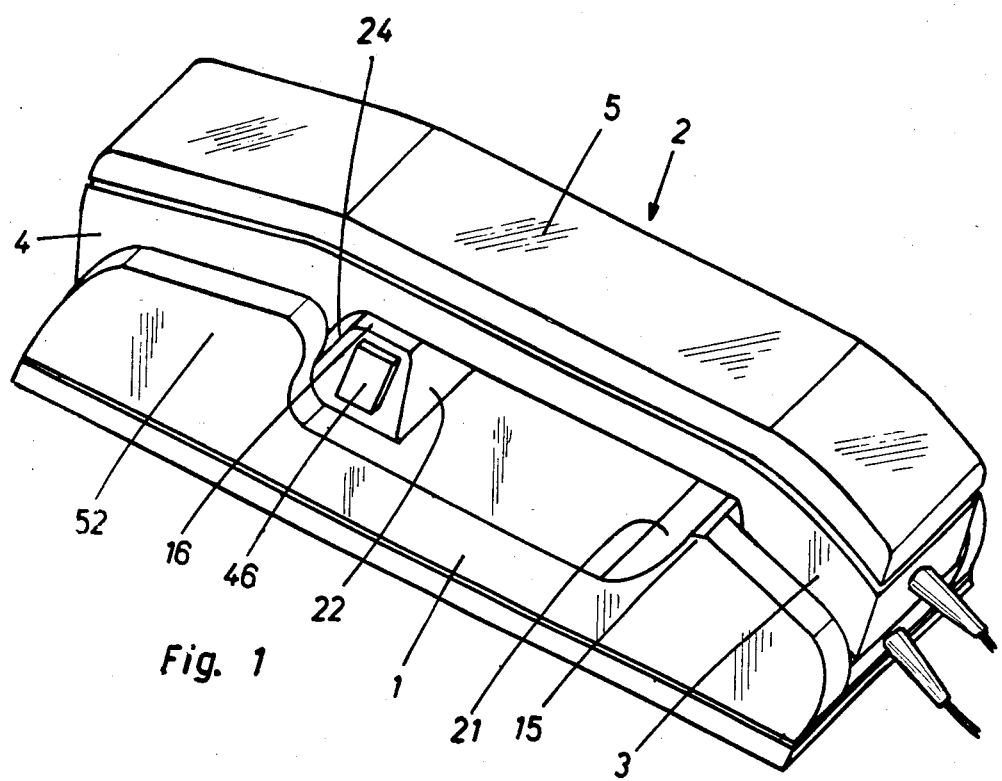

United States Patent [19]

Peiker et al.

[11] Patent Number: 4,723,281
[45] Date of Patent: Feb. 2, 1988

[54] AUTOMOBILE TELEPHONE

[76] Inventors: Andreas Peiker, Terracinaweg 5, D-6380 Bad Homburg v. d. Hoehe; Manfred Kehry, Talblick 28, D-7240 Horb 1, both of Fed. Rep. of Germany

[21] Appl. No.: 735,978

[22] Filed: May 20, 1985

[30] Foreign Application Priority Data

Aug. 27, 1984 [CH] Switzerland ............... 4080/84

[51] Int. Cl.⁴ ............................................. H04M 1/03
[52] U.S. Cl. .................................. 379/433; 379/445; 379/58
[58] Field of Search ............... 179/2 EA, 2 EB, 103, 179/100 R, 100 D, 100 C, 189 R; 455/90, 99, 100, 128; 379/433–435, 445

[56] References Cited

U.S. PATENT DOCUMENTS

| D. 218,172 | 7/1970 | Lawrence | D26/14 |
|---|---|---|---|
| 3,014,990 | 12/1961 | Dicius | 379/437 |
| 3,073,911 | 1/1963 | Mattke et al. | 379/424 |
| 3,167,617 | 1/1965 | Gerhardt | 379/447 |
| 3,344,236 | 9/1967 | Chipping | 379/58 X |
| 3,878,343 | 4/1975 | Van de Wall | 379/435 |
| 3,889,071 | 6/1975 | Davis et al. | 379/455 |
| 4,117,276 | 9/1978 | Zurawski | 379/437 |
| 4,153,822 | 5/1979 | Veda | 379/369 |
| 4,476,354 | 10/1984 | Uchino et al. | 379/445 |
| 4,609,790 | 9/1986 | Kaiwa et al. | 379/455 |

FOREIGN PATENT DOCUMENTS

| 1262722 | 4/1961 | France . |
|---|---|---|
| 2415394 | 9/1979 | France . |
| 86/01059 | 2/1986 | PCT Int'l Appl. ............ 379/445 |
| 1341148 | 12/1973 | United Kingdom . |

OTHER PUBLICATIONS

Irving, "Handset Latch and Delatch System", Motorola Technical Developments, vol. 3, pp. 8–9 (Mar. 1983).

Primary Examiner—Thomas W. Brown
Assistant Examiner—Mark E. Ham
Attorney, Agent, or Firm—Brady, O'Boyle & Gates

[57] ABSTRACT

The mouthpiece and the earpiece (3, 4) of the automobile telephone apparatus are held at the base (1) by means of respectively one locking means (30, 41). The locking means securing the earpiece (4) is constituted by a spring catch (41); the locking means for the mouthpiece (3) is constituted by a lug (30) formed at an elevation (15) of the base (1) or likewise by a spring catch. Upon cradling of the handset (2), both locking means (30, 41) engage into indentations (32, 51) of the mouthpiece and earpiece (3, 4). The handset (2) can be lifted off only by pressing a push button, arranged between the supporting surfaces of the base (1) for the earpiece and mouthpiece (3, 4), of a release means acting on the spring catch (41). The locking means (30, 41) reliably prevent detachment of the handset (2) from the base (1) during a collision and injury thereby to the occupants of the automobile. By the securing of the mouthpiece and earpiece (3, 4), the handset (2) is reliably held on the base (1) even in case of very great forces acting on the handset.

12 Claims, 18 Drawing Figures

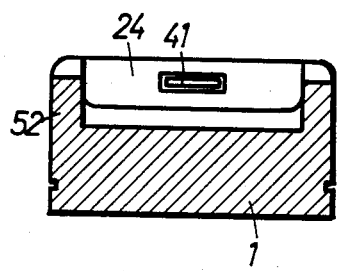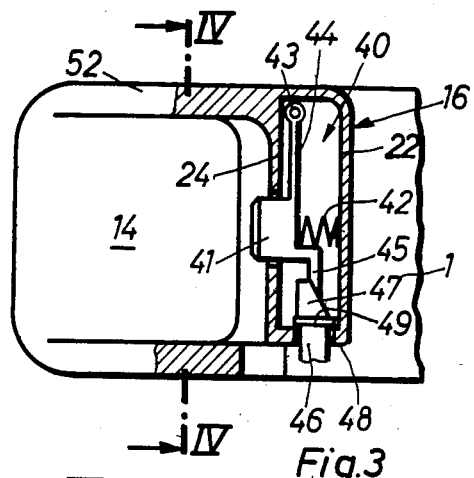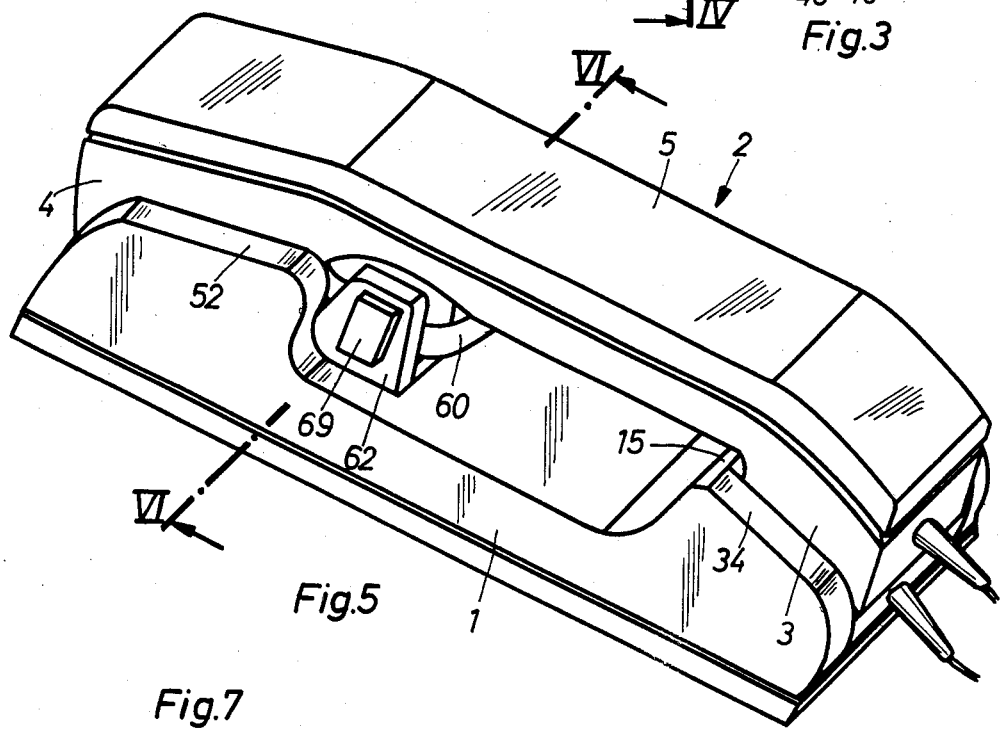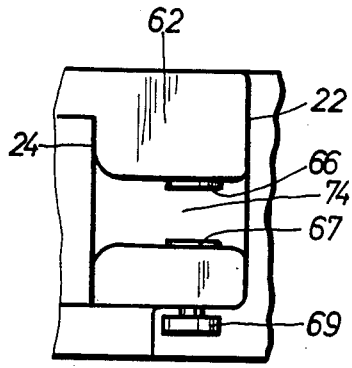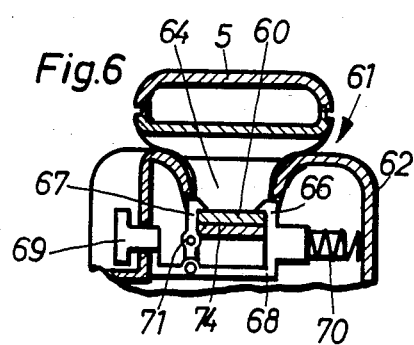

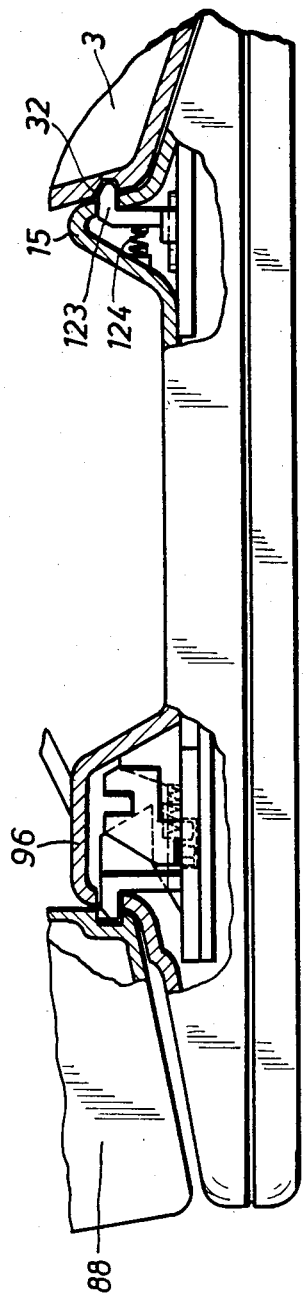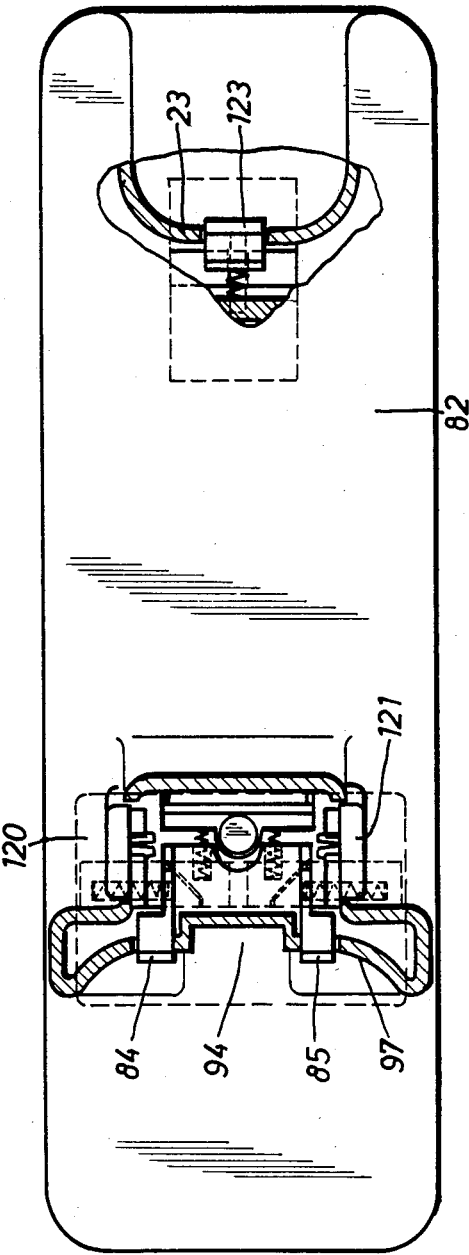
Fig.13
Fig.14

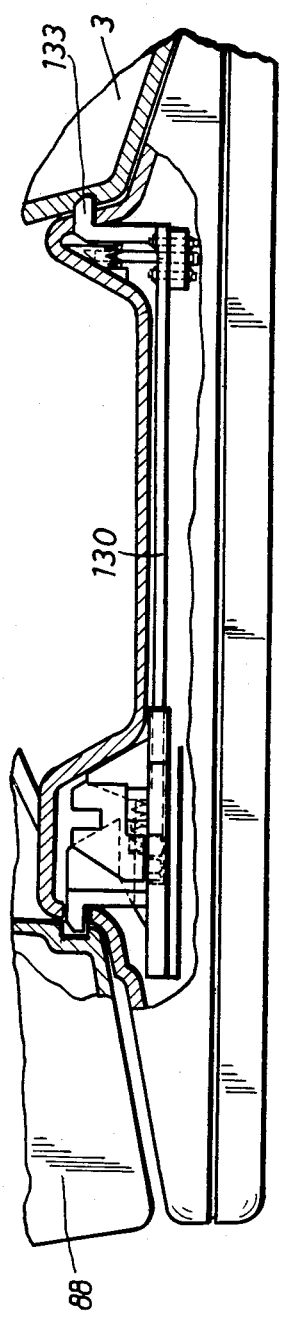
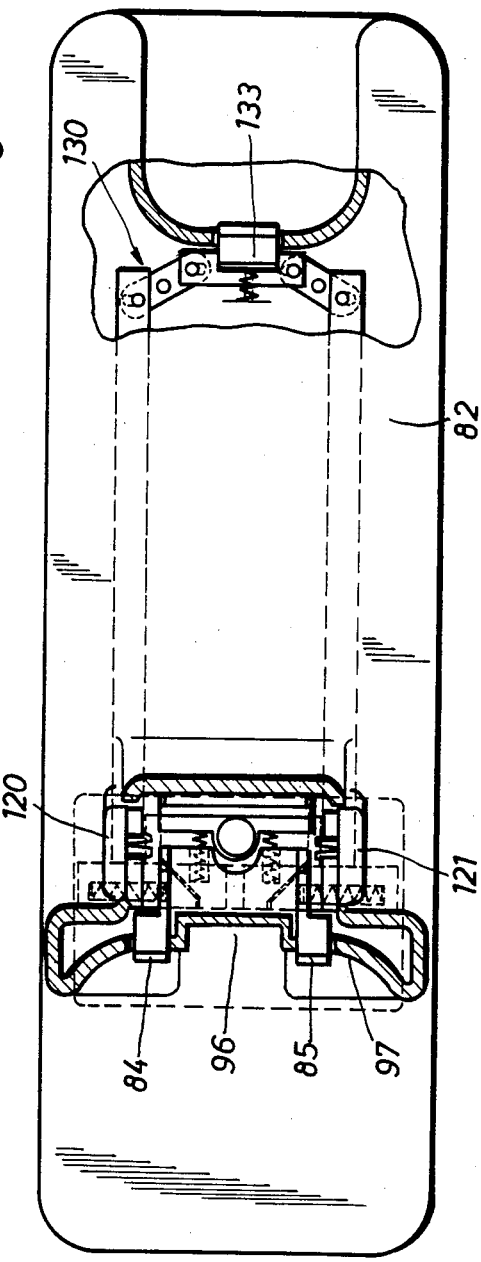

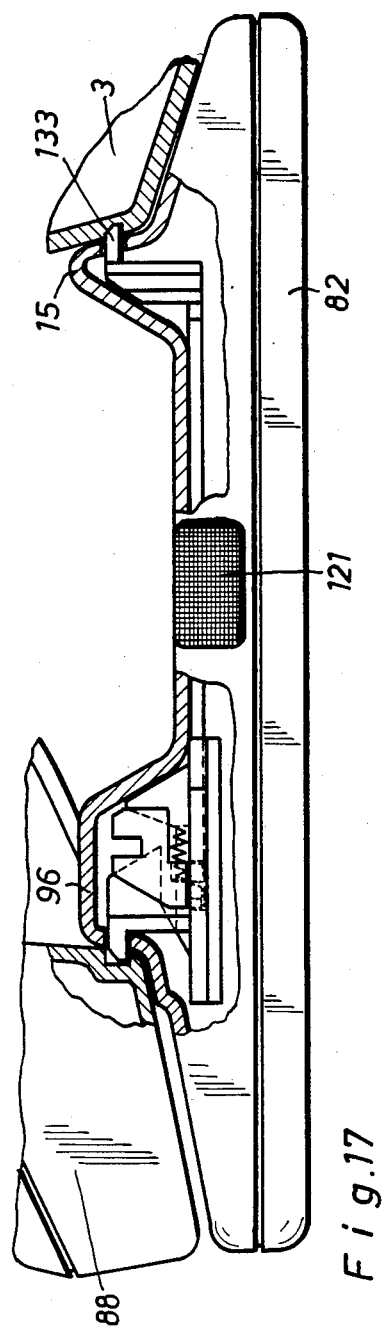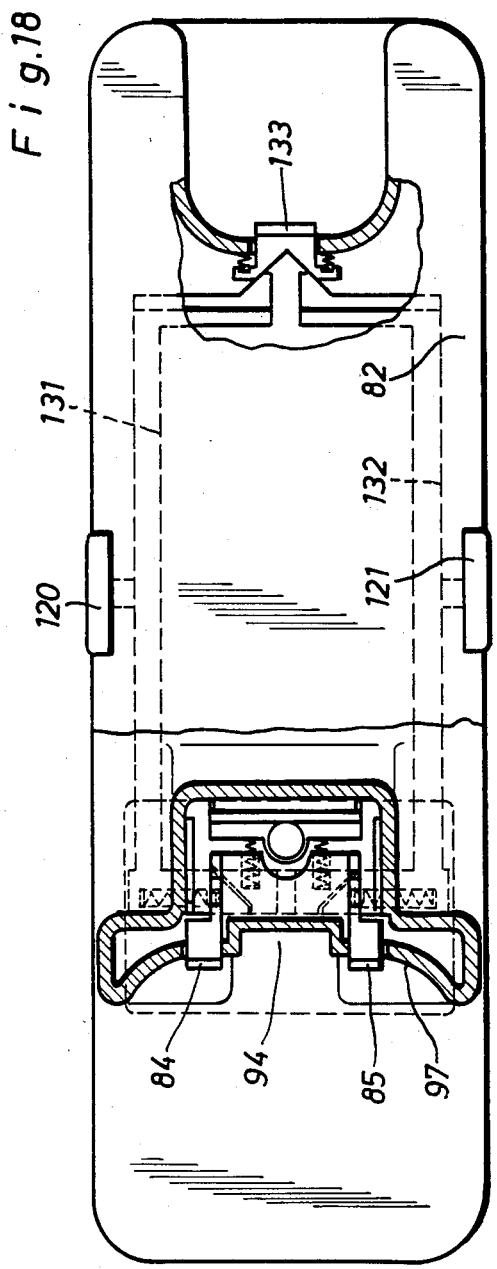

AUTOMOBILE TELEPHONE

The invention relates to a telephone particularly an automobile telephone wherein the telephone can be designed for duplex or simplex operation.

The invention is based on the object of anchoring the cradled handset at the base so that the handset, in case of a collision, under no circumstances can be detached from the base and injure the occupants of the automobile, but yet can be cradled and picked up without any effort.

The essential aspect of the solution of this invention resides in that the handset is securely detained at the base on both sides of its center of gravity, namely with its part exhibiting the mouthpiece as well as with its part carrying the earpiece. If only one of the two parts were secured by a locking means, there would be the danger that, in case of an accident, the forces acting on the handset are enhanced by the lever effect of the latter so that the locking means can no longer retain the handset. Another important aspect is also that the locking units are reliably engaged upon the ordinary cradling of the handset. If the securing of the handset were to depend on inserting the latter in the base in a special position, this would divert the driver's attention from traffic. Additionally, there would be the danger that the driver of the automobile, in traffic situations requiring particular attentiveness, simply deposits the handset beside the base.

Figure 2:
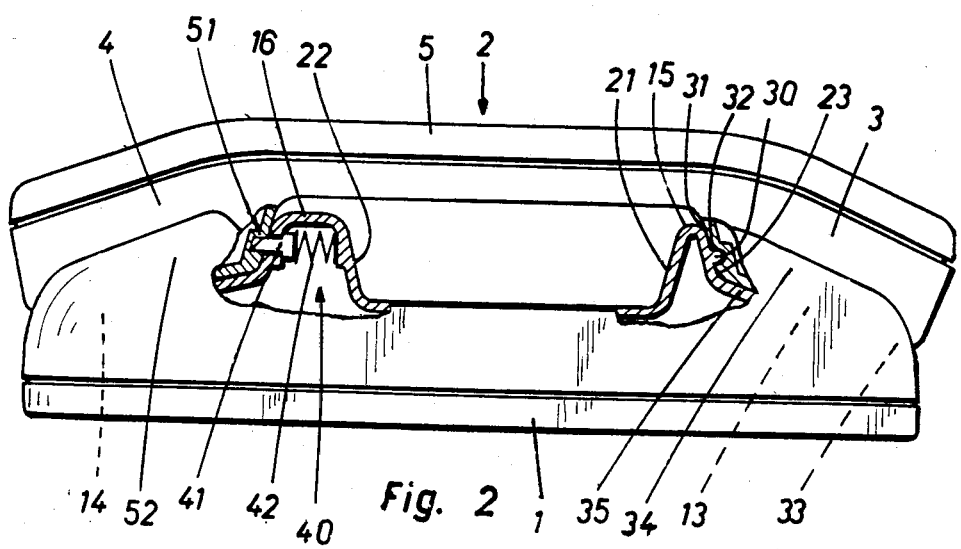
Figure 8:
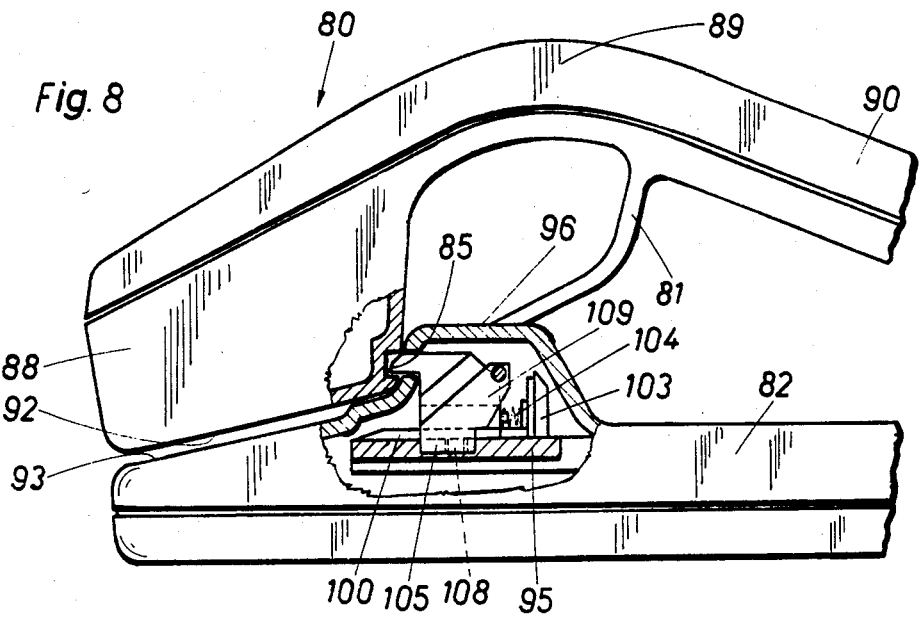
Figure 9:
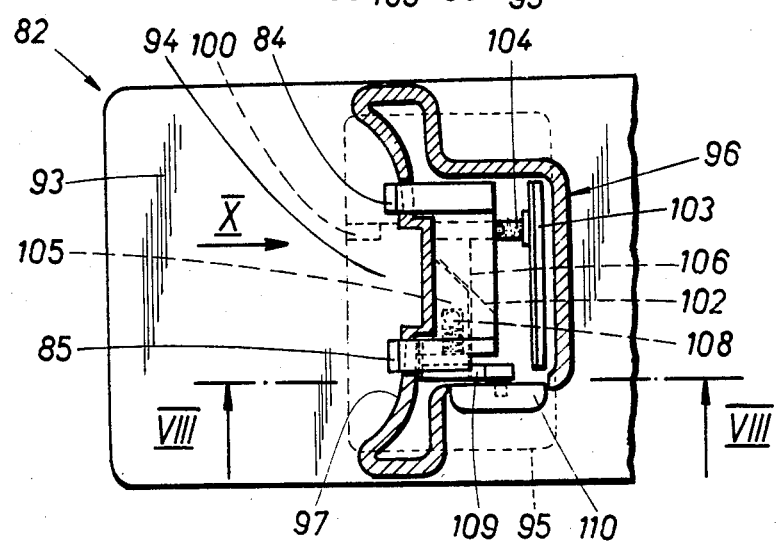
Figure 10:
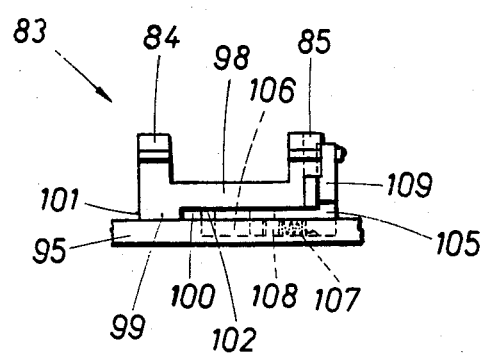
Figure 11:
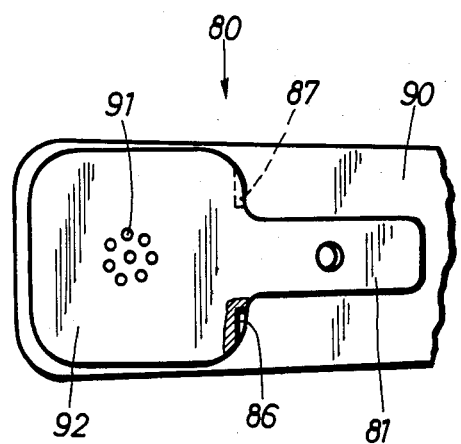
Figure 12:
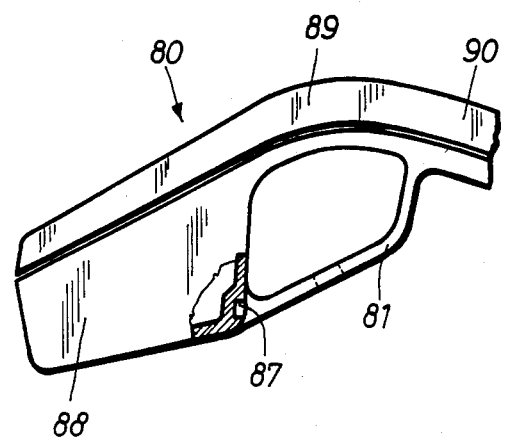

Embodiments of the invention will be described in greater detail below with reference to the drawings wherein:

FIG. 1 shows a perspective view of an automobile telephone,

FIG. 2 shows a lateral view, partially in section, of the automobile telephone of FIG. 1, FIG. 3 shows a top view, partially in section, of a portion of the base for the automobile telephone of FIG. 1, comprising the locking means for the earpiece and the release means, FIG. 4 shows a cross section through the base of the automobile telephone along line IV—IV in FIG. 3, FIG. 5 shows a perspective view of a modification of the automobile telephone of FIG. 1 with a bracket at the handset, FIG. 6 shows a cross section through the portion of the base of the automobile telephone comprising the locking means for the earpiece and the release means, along line VI—VI in FIG. 5, FIG. 7 shows a top view of the portion of the base illustrated in FIG. 6, FIG. 8 shows a lateral view, partially in section (line VIII—VIII in FIG. 9) of part of a further development of the automobile telephone of FIG. 5, FIG. 9 shows a top view, partially in section, of the portion of the base for the automobile telephone of FIG. 8 comprising the locking means for the earpiece and the release means, FIG. 10 shows an elevational view of the locking means and release means in the viewing direction X in FIG. 9, without the base, FIG. 11 shows a bottom view of the part of the handset illustrated in FIG. 8, FIG. 12 shows a lateral view, partially in section, of the portion of the handset illustrated in FIG. 8, FIG. 13 shows a lateral view, partially in section, of a further development of the automobile telephone of FIGS. 8–12, FIG. 14 shows a top view, partially in section, of the base of the automobile telephone in FIG. 13, FIG. 15 shows a lateral view, partially in section, of another version of the automobile telephone of FIGS. 13 and 14, FIG. 16 shows a top view, partially in section, of the base for the automobile telephone of FIG. 15, FIG. 17 shows a lateral view, partially in section, of another version of the automobile telephone of FIGS. 15 and 16, and FIG. 18 shows a top view, partially in section, of the base for the automobile telephone of FIG. 17.

The automobile telephone illustrated in FIGS. 1 through 4 comprises a base 1 for the transmitter-receiver (handset) 2; this base is to be mounted in the vehicle and is designed as a supporting unit. The mouthpiece 3 (i.e. the housing portion of the handset receiving the transmitter unit) and the earpiece 4 project in the usual way transversely to the grasping part 5 of the handset. The base 1 has two cradles 13 and 14 for the mouthpiece and earpiece 3 and 4. The two cradles 13 and 14 are defined at the mutually facing ends by respectively one elevation 15 and 16. The mutually facing walls of the elevations 15, 16 are denoted by 21, 22; the walls facing away from each other are denoted by 23, 24.

A lug 30 is formed at the wall 23 of the projection 15, constituting the locking means for the mouthpiece 3; this lug engages into a depression 32 on the side 31 of the mouthpiece 3. The cradle 13 is open at the end facing away from the projection 15 and has sidewalls 34 securing the mouthpiece 3 against lateral shifting.

The elevation 16 is hollow and houses a locking or latch means 40 with a release means. The latch means 40 has a spring catch (pawl) 41 constituting the blockage for the earpiece 4; this catch is extended through an opening in the wall 24 and is stressed by a spring 42 supported on the wall 22. The spring catch 41 is arranged on an arm 44 rotatably mounted about an axle 43 and is provided with a finger 45 contacting the wedge surface of a wedge 47 which latter can be advanced in the longitudinal direction by means of a push button 46. The wedge 47 is advanced by exerting pressure on the push button 46 extending outwardly through the sidewall 48 from the housing 16 of the locking means 40, the finger 45 sliding along the wedge surface and retracting the spring catch 41 against the bias of the spring 42 into the housing 16 of the locking means 40. When the push button 46 is released, the spring 42 urges the spring catch 41 into the rest position illustrated in the drawing wherein the finger 45 pushes the wedge 47 with the push button 46 backwards until the stop 49 of the push button abuts against the inside of the sidewall 48. The earpiece 4 has a recess 51 for the spring catch 41 on its side facing the mouthpiece 3, and the spring catch is beveled on its topside in the manner of a catch bolt so that it is initially urged backward, when the handset 2 is cradled, by the portion of the earpiece 4 adjoining the recess 51 at the bottom, and then snaps into the recess 51. The sidewalls 52 of the cradle 14 effect lateral guidance of the earpiece 4 during this process.

The handset 2 can be put in place in the horizontal position and in a forwardly inclined or rearwardly inclined position. If cradled with the mouthpiece 3 leading, then the lug 30 first slides into the depression 32 and subsequently the portion of the earpiece 4 adjoining the recess 51 at the bottom will urge the spring catch 41 backwards until the latter snaps into the recess 51. If cradled with the earpiece 4 leading, then the spring catch 41 engages first, and thereafter the portion of the earpiece 3 adjoining the depression 32 obliquely from the bottom will contact the lug. By exerting pressure on the handset 2, its housing which consists of a synthetic resin is somewhat spread apart due to its inherent elasticity, and the lug 30 slides along the inclined surface of the mouthpiece 3 into the depression 32. The transceiver 3 is now secured, by the spring catch 41 and the lug 30, against lifting off, and by the walls 23, 24 against longitudinal displacement and thus against sliding off the catch 41 and/or the lug 30. A lateral shifting of the transceiver 3 is prevented by the spring catch 41 and the lug 30, as well as additionally also by the sidewalls 34, 52 of the cradles 13, 14.

In case a strong tensile force is exerted on the handset 2 during a collision—accelerations of up to 30 g are expected—the handset remains secured to the base 1, even in case it is somewhat bent on account of its inherent elasticity, since the tensile forces attack at the center of gravity of the handset, i.e. at the grasping portion 5 between the mouthpiece and earpiece 3, 4, and therefore do not result in a spreading apart but, on the contrary, a curling together of the handset 2, i.e. an approaching of mouthpiece and earpiece 3, 4, and consequently in an even firmer hold.

Of course, the lug 30 is to be dimensioned so that it extends into the depression 32 to a sufficient extent, the dimensioning being limited by the elasticity of the handset 2, namely it should be selected to be only of such a size that the pressure required for bending open the handset 2 can be readily exerted with the hand holding the handset. Instead of being rounded, as illustrated in FIG. 2, the lug 30 can also be designed as a latch or a human nose, namely with an inclined surface at the top and a horizontal surface at the bottom.

For pickup, the handset 2 is seized with the right hand and simultaneously pressure is exerted by the thumb of this hand on the push buttom 46 whereby the spring catch 41 is disengaged. (When grasping with the left hand, the push button 46 can be operated with the index finger.) For a one-handed lifting of the handset, it is essential that the push buttom 46 can be pressed conveniently with one finger of the hand grasping the handle 5. This is ensured, in the illustrated embodiment, by the arrangement of the push buttom 46 on the side of the projection 16 extending into the corner zone between the handle 5 and the earpiece 4.

The further development of the automobile telephone shown in FIGS. 5 through 7 differs from the above-described embodiment by a bracket 60 arranged at the handset and by the differently designed locking or latch means 61. Otherwise, especially in the zone of the mouthpiece cradle, the modification can be of the same structure as the embodiment described above, so that merely the deviating features will be explained in greater detail below.

The bracket 60 is arranged at the portion of the handle 5 of the handset directly adjoining the earpiece 4, and the space encompassed by the bracket and by the handle 5 is dimensioned to be of adequate size to be conveniently passed through by the thumb of the hand holding the grasping portion 5. By the bracket 60, the handset is secured on the thumb against sliding off from the hand in case, during telephoning, the hand holding the handset must aid for a short time in operating the vehicle (driving through a curve, shifting, turning on windshield wipers, dimming lights, etc.).

The locking or latch device 61 cooperates with the bracket 60 in the way described further below and secures the bracket, and thus also the earpiece 4, on the base. Accordingly, the recess 51 in the earpiece 4, necessary in the embodiment of FIGS. 1–4, is eliminated.

The device 61 is arranged in a hollow elevation 62 located at the same place as elevation 16; this hollow elevation has an indentation 64 in the central zone of its transverse dimension for accommodating the bracket 60. The elevation 62 thus has a bifurcate shape with two fork legs defining the indentation 64; the bracket 60, during cradling, slides into the indentation 64 between these fork legs. The device 61 has two spring catches or pawls 66, 67 extending into the indentation 64 from both sides through cutouts in the two mutually facing walls of the fork legs. The latch 66 is formed on the end of a push rod 68 on the right in FIG. 6; this rod can be advanced against the bias of a spring 70 supported on the outer wall of the elevation 62 by a push button 69 located at the same place as push button 46. The latch 67 is pivotably mounted about an axle and articulated to the push rod 68 so that upon advance of the rod 68 caused by pressure on push button 69, the two latches 66, 67 move out of indentation 64. Upon release of push button 69, the spring 70 urges push rod 68 and catches 66, 67 into the rest position illustrated in FIG. 6. Upon cradling of the handset, the latches 66, 67, beveled at the top in the manner of a catch bolt, are urged backwards by the lower portion of the bracket 60 and then snap into place above this bracket so that the bracket 60 is retained between the latches 66, 67 and the bottom 74 of the indentation 64.

In the version of the automobile telephone shown in FIGS. 8–12, the handset 80, similarly as in the embodiment of FIGS. 5–7, has a bracket 81 and the supporting means or base 82 likewise has a locking or latch means 83, the spring catches 84, 85 of which, however, do not extend into the bracket 81 but rather into recesses 86, 87 of the earpiece 88, as will be described below.

The handset 80 is bent at an obtuse angle in the longitudinal direction, the bend 89 being formed in the portion of the handle 90 adjoining the earpiece 88. The bracket 81 is designed to be narrower than the earpiece 88 and extends from the rim of the wall 92 of the earpiece exhibiting the sound apertures 91 past the corner zone between the earpiece and the handle and past the bend 89 to the inside of the portion of the handle 90 following the bend and extending linearly to the mouthpiece. The recesses 86, 87 are located on both sides of the bracket 81 on the lower marginal zone of the earpiece 88 facing the mouthpiece.

The mounting base 82 is formed at the rear end (not shown in FIGS. 8 and 9), in the same way as the mounting base 1, with a cradle for the mouthpiece and with a lug engaging into a depression or recess of the mouthpiece. At the front end, the base 82 does not have a cradle but rather a planar or slightly convexly curved supporting surface 93 for the earpiece 88. The base 82 is designed to be of the same width over its entire length, and the handset 80 tapers from the earpiece toward the mouthpiece, so that the earpiece 88, designed of equal width as the base 82, adjoins flush the edges of the base, and the narrower mouthpiece fits into the cradle.

The locking means 83 is arranged on a plate 95 mounted in the hollow base 82 and projects into the cavity defined by an elevation 96 adjoining the supporting surface 93. The front wall 97 of the elevation 96 is adapted to the lower marginal zone of the earpiece 88 exhibiting the recesses 86, 87 and is inclined toward the vertical in correspondence with this marginal zone, so that the earpiece slides toward the left in FIG. 8 when cradled (away from the cradle for the mouthpiece) and, when lifted, slides toward the right. The wall 97 has two openings for the two spring catches 84, 85, beveled at the top in the manner of a catch bolt; these catches are formed at the legs of a U-shaped support 98. The upper wall of the elevation 96 has a recess 94 projecting in between the legs of the U-shaped support 98; this recess accommodates the bracket 81 of the cradled handset 80. The U-shaped support 98 has a trapezoidal foot 99 sliding on the plate 95 and exhibiting a groove guided on a guide rail 100 arranged on the plate 95 in the longitudinal direction of the base 82. One leg 101 of the trapezoidal base 99 is flush with the lateral face of the support 98 which is at the top in FIG. 9 (on the left-hand side in FIG. 10); the other leg 102 adjoins the front end (the left-hand end in FIG. 9) of the groove and extends under an angle of 45° obliquely rearwardly away from the groove. A compression spring 104 supported on a supporting wall 103 urges the support 98 in FIG. 9 toward the left whereby the inclined leg 102 is pressed against a correspondingly oblique marginal surface of a slide 105 of a release means. The slide 105 is mounted in a rectangular depression 106 of the plate 95 to be displaceable perpendicularly to the rail 100, namely against the force of a compression spring 107 arranged in a recess on the underside of the slide, one end of this spring being supported at the rim of the recess which is at the bottom in FIG. 9, and the other end of this spring being supported on a bolt 108 projecting from the bottom of the indentation 106. This bolt forms an abutment for the rim of the recess which is at the top in FIG. 9 and retains the slide 105 against the bias of the spring 107 in the rest position illustrated in the drawing. The thickness of the slide 105 is dimensioned so that the slide projects from the indentation 106 and the lower surface of the support 98, adjoining the foot 99 (on the right-hand side in FIG. 10), is slidingly resting on this slide. At the end of the slide 105 at the bottom in FIG. 9, a member 109 of a plate configuration and projecting obliquely upwardly is integrally formed therewith, carrying a push button 110 that can be pressed through a cutout in the sidewall of the projection 96. The push button 110 is suitably designed as an illuminated key.

Upon cradling of the handset 80, the spring catches 84, 85 are urged back from the rim of the earpiece wall 92 whereupon they snap into the cutouts 86, 87 under the action of the spring 104. In order to lift the handset, the push button 110 is pressed with the thumb of the hand seizing the handset whereby the slide 105 is advanced against the bias of the spring 107, the inclined leg 102 of the supporting foot 99 slides backwards on the inclined marginal surface of the slide 105 against the bias of the spring 104, and the spring catches 84, 85 are disengaged from the cutouts 86, 87. Upon lifting of the handset, the thumb is placed against the handle portion encompassed by the bracket 81; this takes place, on account of the large interspace provided by the bent portion 89 between the bracket and the handle, not only without effort but even perforce, because the bracket impedes movement of the thumb out of the handle portion encompassed by this bracket. The bracket 81 then secures the handset 80 against sliding out of one's hand as explained above in connection with the bracket 60. Due to the large interspace between bracket 81 and handle 90, created by the bend 89, the thumb can be left in the bracket while cradling the handset.

The three embodiments of the automobile telephone illustrated in FIGS. 13 through 18 are designed similarly to the version in FIGS. 8–12. Therefore, the following description will merely address itself briefly to the differences.

In the automobile telephone shown in FIGS. 13 and 14, the release means exhibits on both sides of the elevation 96 respectively one push button 120, 121. Both push buttons 120, 121 act independently of each other, and in the same way as the push button 110, on respectively one slide engaging, corresponding to the slide 105, at the base of the support exhibiting the spring catches 84, 85. The spring catches 84, 85 thus can be disengaged by pressure on the one push button 120 as well as by pressure on the other push button 121.

The locking means engaging into the indentation of the mouthpiece 3 is constituted by a latch 123, one leg of which is arranged in the cavity of the elevation 15 and is stressed by a spring 124, and the other leg of which projects through the wall 23 of the elevation 15 and is beveled at the free end in the manner of a catch bolt.

When the mouthpiece 3 is cradled, the latch 123 is urged backwards against the bias of the spring 124 and then catches in the indentation 32. The indentation 32 and the latch part engaging therein are designed so that the mouthpiece 3 is not lifted but, after disengagement of the spring catches 84, 85 and slight lifting of the earpiece 88, slides out of the latch 123 by a small horizontal motion component. The horizontal motion component results perforce from the fact that the earpiece 88, during disengagement of the spring catches 84, 85, slides over the inclined front wall 97 of the elevation 96. (The same holds true if the lug 30 is provided in place of the latch 123.)

The latch 123 is provided instead of the lug 30 if bending of the handset is undesirable or impossible, for example if a dialing unit is arranged in the handle of the handset. If this is not the case, i.e. if the dialing equipment is arranged, for example, in the base, then the lug 30 is preferred on account of a simpler manufacture.

The embodiment illustrated in FIGS. 15 and 16 differs from that of FIGS. 13 and 14 in that the latch 133, corresponding to latch 123, is connected by a lever mechanism 130 with the support exhibiting the spring catches 84, 85, so that upon pressing one of the push buttons 120, 121, the catches 84, 85 as well as the latch 133 are released.

FIGS. 17 and 18 show an embodiment wherein the release means, in the same way as in the embodiment of FIGS. 15 and 16, acts on the locking means (spring catches 84, 85, latch 133) securing the earpiece 88 as well as the mouthpiece 3. In this connection, the push buttons 120, 121 are arranged approximately in the middle between the elevations 15 and 96 in lateral cutouts of the mounting means 82 and are connected by means of a bar 131, 132 extending respectively in the longitudinal direction, with the slides (corresponding to slide 105) serving for disengagement of the spring catches 84, 85, as well as with corresponding members, not shown in the drawing in detail, for releasing the latch 133.

The base can be mounted in the vehicle in any desired position and can be arranged, instead of horizontally, for example also vertically.

The locking means on which the release means is not effective, especially the lug 30, can readily be arranged, instead of at the base, also at the handset, especially the mouthpiece. Basically, the locking means on which the release means is effective could also be located at the handset together with the release means; the push button of the release means could be arranged, for example, on the underside of the handle of the handset. However, as compared with the arrangement of the release means and the locking means affected thereby at the base, this arrangement has the disadvantage that the handset becomes heavier and its handiness is impaired.

The cradle or hook reversing switch of an automobile telephone for duplex-type communication can be disposed on the bottom of the bracket-receiving indentation 36, 94; the speaking key of an automobile telephone for simplextype communication can be arranged on the inside of the handle of the handset between the bracket and the mouthpiece.

I claim:

1. A telephone comprising:
    a telephone handset (2; 80) having a housing with a handle (5; 90) and a mouthpiece (3) and an earpiece (4, 88) on opposite ends thereof,
    said earpiece (4; 88) and said mouthpiece (3) having mutally facing sides and a listening and a speaker face (92, -), repectively,
    a base (1; 82) to be mounted in a vehicle,
    said base (1; 82) having a first and a second bottom face (14, 13; 93, -) for supporting said listening and speaker faces (92, -), respectively, and a first and a second cradle (24, 52; 23, 34; 97) opening away from each other for guiding and supporting said mutually facing sides of said earpiece (4; 88) and said mouthpiece (3) and for guiding and securing the earpiece (4; 88) and the mouthpiece (3) against lateral shifting,
    a spring-loaded (42; 104) locking pawl (41; 84, 85) movably mounted at said first cradle (24, 52; 97) or at said mutual facing side of said earpiece (4; 88) and adapted to lock said earpiece (4; 88) at said first cradle (24, 52; 97),
    a locking lug (30), fixedly arranged on said facing side of said mouthpiece (3) or on said second cradle (23, 34),
    a first recess (51; 86, 87) provided in said first cradle (24, 52; 97) or in said facing side of said earpiece (4; 88) for receiving said locking pawl (41; 84, 85),
    a second recess (32) provided in said second cradle (24, 52; 97) or in said facing side of said mouthpiece (3) for receiving said locking lug (30),
    release means (46; 110; 120, 121) connected for releasing said locking pawl (41; 84, 85),
    said release means (46; 110; 120, 121) being actuable by manually actuating means (46; 110, 120, 121) disposed in such a way that they are actuable by one finger of the hand grasping the handle (5; 90) of the handset (2; 80),
    said cradles (24, 52; 23, 34; 97), said locking pawl (41; 84, 85), said locking lug (30) and said handset housing (2; 80) being formed, and said handset housing (2; 80) being elastically flexible in such a way, that the handset (2; 80) can be cradled and secured on said base (1; 82) regardless of the sequence in which the earpiece (4; 88) and the mouthpiece (3) are introduced in the first and second cradle (24, 52; 23, 34; 97) but can only be lifted off after actuating said release means (46; 110; 120, 121),
    in that upon cradling the pawl (41; 84, 85) is urged by said first cradle (24, 52; 97) or said earpiece (4; 88), respectively, against the spring-load (42; 104) and snaps under the action of the spring-load (42; 104) into the first recess (51, 86, 87) regardless of the sequence of introducing the earpiece (4; 88) and mouthpiece (3), and the locking lug (30) engages into the second recess (32) either when the mouthpiece (3) is introduced at first by slipping the speaker face over the second bottom face (13) into the second cradle (23, 34) or when the earpiece (4; 88) is introduced at first by exerting pressure by hand on the handle (5; 90) of the handset (2; 80), so that the latter flexes up and said mutually facing side of the mouthpiece (3) is forced away from that face (23) of the second cradle (23, 34) having the lug (30) or the second recess (32), respectively,
    and in that after actuation of said release means (46; 110; 120, 121) drawing of the handset (2; 80) away from the base results in a sliding movement of the earpiece (4; 88) at the first cradle (24, 52; 97), which sliding movement has an upward component and a component towards said second cradle (23, 34), so that the speaker face slips over the second bottom face (13) and the mutually facing side of the mouthpiece (3) runs away from that face (23) of the second cradle (23, 34) having the lug (30) or the second recess (32), respectively, and the lug (30) disengages from the second recess (32).

2. A telephone according to claim 1, characterized in that the release means is arranged in an elevation (16; 96) supporting the earpiece (4; 88) and is operable by means of at least one push button (46; 69; 110; 120, 121) laterally located at one side of said elevation (16; 96) so that the push button can be activated with one finger of the hand grasping the handle (5; 90) of the handset (2; 80).

3. A telephone comprising:
    a telephone handset (2; 80) having a housing with a handle (5; 90) and a mouthpiece (3) and an earpiece (4; 88) on opposite ends thereof,
    said earpiece (4; 88) and said mouthpiece (3) having mutually facing sides and a listening and a speaker face (92, -),
    a base (1; 82) to be mounted in a vehicle, said base (1; 82) having a first and a second cradled (24, 52; 23, 34; 97) including inner transverse faces (24, 23; 97), raised side portion (52, 34; 97), and a first (14; 93) and a second (13) bottom face being completely open at the outer ends opposite the inner transverse faces (24, 23; 97) for respectively supporting at least a portion of said listening and speaker faces (92, -), said raised side portions (52, 34; 97) guiding and supporting said mutually facing sides of said earpiece (4; 88) and said mouthpiece (3) and for guiding and securing the earpiece (4; 88) and the mouthpiece (3) against lateral shifting,
    a spring-loading locking pawl movably mounted at said second cradle (23, 34) or at said mutual facing side of said mouthpiece (3) and adapted to lock said mouthpiece (3) at said second cradle (23, 34),
    a locking lug, fixedly arranged on said facing side of said earpiece (4; 88) or on said first cradle (24, 52; 97), a first recess provided in said second cradle (23, 34) or in said facing side of said mouthpiece (3) for receiving said locking pawl, a second recess provided in said first cradle (24, 52; 97) or in said facing side of said earpiece (4; 88) for receiving said locking lug, release means (46; 110; 120, 121) connected for releasing said locking pawl, said release means (46; 110; 121) being actuable by manually actuating means (46; !10; 120, 121) disposed in such a way that they are actuable by one finger of the hand grasping the handle (5; 90) of the handset (2; 80), said cradles (24, 52; 23, 34; 97), said locking pawl, said locking lug and said handset housing (2; 80) being formed, and said handset housing (2; 80) being elastically flexible in such a way, that the handset (2; 80) can be cradled and secured on said base (1; 82) regardless of the sequence in which the earpiece (4; 88) and the mouthpiece (3) are introduced in the first and second cradle (24, 52; 23, 34; 97) but can only be lifted off after actuating said release means (46; 110; 120, in that upon cradling the pawl is urged by said second cradle (23, 34) or said mouthpiece (3), respectively, against the spring-load and snaps under the action of the spring-load into the first recess regardless of the sequence of introducing the earpiece (4; 88) and mouthpiece (3), and the locking lug engages into the second recess either when the earpiece (4; 88) is introduced at first by slipping the listening face (92) in the direction of the longitudinal axis of the handset onto and over the first bottom face (14; 93) through the open outer end thereof and toward the inner transverse face (24; 97) guided by the raised side portions (52; 97) into the first cradle (24, 52; 97), while the speaker face of said mouthpiece (3) slides over the top (15) of the inner transverse face (23) of said second cradle (23, 34) and drops into said second cradle when the earpiece (4; 88) abuts against said inner transverse face (24; 97) of said first cradle (24, 52; 97), or when the mouthpiece (3) is introduced at first by sliding the speaker face in the direction of the longitudinal axis of the handset onto and over the second bottom face (13) through the open outer end thereof into the second cradle (23, 34) and exerting pressure by hand on the handle (5; 90) of the handset (2; 80), so that the latter flexes up and said mutually facing side of the earpiece (4; 88) is forced away from the inner transverse face (24) of the first cradle (24, 52; 97) having the lug or the second recess, respectively, and in that after actuation of said release means (46; 110; 120, 121) drawing of the handset (2; 80) away from the base results in a sliding movement of the mouthpiece (3) at the second cradle (23, 34), which sliding movement has an upward component and a component towards said first cradle (24, 52; 97), so that the listening face (92) slips over the first bottom face (14) and the mutually facing side of the earpiece (4; 88) runs away from the inner transverse face (24) of the first cradle (24, 52; 97) having the lug or the second recess, respectively, and the lug disengages from the second recess.

4. A telephone comprising:
a telephone handset (80) having a housing with a handle (90) and a mouthpiece (3) and an earpiece (88) on opposite ends thereof, said earpiece (88) and said mouthpiece (3) having mutually facing sides and a listening and a speaker face (92, -), a base (82) to be mounted in a vehicle, said base (82) having a first and a second bottom face (93, -) for supporting said listening and speaker faces (92, -) and a first and a second cradle (97, 23) opening away from each other for guiding and supporting said mutually facing sides of said earpiece (88) and said mouthpiece (3) and for guiding and securing the earpiece (88) and the mouthpiece (3) against lateral shifting, a first spring-loaded (104) locking pawl (84, 85) movably mounted at said first cradle (97) or at said mutual facing side of said earpiece (88) and adapted to lock said earpiece (88) at said first cradle (97), a second spring-loaded (124) locking pawl (123) movably mounted at said second cradle (23) or at said mutual facing side of said mouthpiece (3) and adapted ot lock said mouthpiece (3) at said second cradle (23), a first recess (86, 87) provided in said first cradle (97) or in said facing side of said earpiece (88) for receiving said first locking pawl (84, 85), a second recess (32) provided in said second cradle (23) or in said facing side of said mouthpiece (3) for receiving said second locking pawl (123), release means (120, 121) operatively connected to at least one of said first and second locking pawls (84, 85, 123) for releasing the same, said release means (120, 121) being actuable by manually actuating means (120, 121) disposed in such a way that they are actuable by one finger of the hand grasping the handle (90) of the handset (80), said cradles (23, 97), said locking pawls (84, 85, 123) and said handset housing (80) being formed in such a way, that the handset (80) can be cradled and secured on said base (82) regardless of the sequence in which the earpiece (88) and the mouthpiece (3) are introduced in the first and second cradle (97, 23) but can only be lifted off after actuating said release means (120, 121), whereby upon cradling the first and the second pawl (84, 85, 123) are urged by the first and the second cradle (97, 23) or the earpiece (88) or mouthpiece (3), respectively, against the spring-load (104; 124) and snaps under the action of the spring-load (104, 124) into the first and the second recess (86, 87, 32).

5. A telephone according to claim 4, wherein the release means (120, 121) act either only on said first or only on said second locking pawl (84, 85, 123), and said cradles (23, 97) and said handset housing (80) being formed in such a way that after actuation of said release means (120, 121) drawing at the handset (80) results in a sliding movement of the earpiece (88) or the mouthpiece (3), respectively, at the first cradle (97) or the second cradle (23), respectively, which sliding movement has an upward component and a component towards said second cradle (23) or first cradle (97), respectively, so that the speaker face or the listening face (92), respectively, slips over the second bottom face or first bottom face, respectively, and the mutually facing side of the mouthpiece (3) or the earpiece (88), respectively, runs away from that face (23; 97) of the second cradle (23) or first cradle (97), respectively, bearing the second locking pawl (123) or first locking pawl (84, 85), respectively, or the second recess (32) or first recess (86, 87), respectively, and the second locking pawl (123) or first locking pawl (84, 85) being not actuated by the release means (120, 121) disengages from the second recess (32) or first recess (86, 87), respectively.

6. A telephone according to claim 4, wherein the release means (120, 121, 130, 131, 132) is operatively connected to both the first and the second locking pawl 7. A telephone comprising:
   a telephone handset (2; 80) having a housing with a handle (5; 90) and a mouthpiece (3) and an earpiece (4, 88) on opposite ends thereof, and
   a bow (60; 81) located on the inside of the portion of the handle (5; 90) adjoining the earpiece (4; 88) and being formed in such as way, that the thumb of the hand of the user gripping the handle (5; 90) is introducible in a space between the bow (60; 81) and the handle (5; 90), so that the handset (2; 80) is kept hanging on the thumb and the other fingers of the hand are free for other functions.

8. A telephone according to claim 7, further comprising:
   a base (1; 82) to be mounted in a vehicle,
   locking means (41; 66, 67; 84, 85; 123, 133) adapted to lock said handset (2; 80) at said base (1; 82),
   release means for releasing said locking means (41; 66, 67; 84, 85; 123; 133),
   manually actuable means (46; 69; 110; 120, 121) connected for actuating said release means,
   said manually actuable means (46; 69; 110; 120, 121) being arranged at the base (1; 82) beside the bow (60; 81) of the cradled handset (2; 80), so that the manually actuable means (46; 69; 110; 120, 121) is actuable by the thumb of the hand of the user gripping the handle (5; 90) and thereafter the thumb is introducible in the space between the bow (60; 81) and the handle (5; 90) without changing the position of the hand gripping the handle (5; 90).

9. A telephone as set forth in claim 8, in which said bow (60, 81) has a width that is narrower than the width of the earpiece (4; 88), an elevated portion (62; 96) on said base (1; 82) supporting said earpiece (4; 88), an indented passage (64; 94) through said elevated portion receiving said bow (60, 81) therein and securing said bow and said handset against lateral shifting on said base (1, 82), said locking means for the earpiece portion of said handset and said release means connected for releasing said locking means connected in said elevated portion (62, 96), and said locking means engaging said bow (60, 81) or earpiece (88) adjacent its connection with said bow.

10. A telephone as set forth in claim 7, in which said handle (5; 90) has a longitudinal axis, said earpiece (88) connected (89) to said handle, at an obtuse angle to the longitudinal axis of said handle, and said bow (81) extends around the obtuse angle connection.

11. A telephone according to claim 7, in which said bow (60; 81) bridges a corner between the earpiece (4; 88) and the handle (5, 90).

12. A telephone according to claim 7, in which said earpiece includes a wall (92) with sound aperture (91) forming a listening face, said wall (92) having a rim, one end of the bow (81) adjoins the rim of the wall (92) of the earpiece (88) exhibiting the sound aperture (91).

* * * * *